Figure 1:
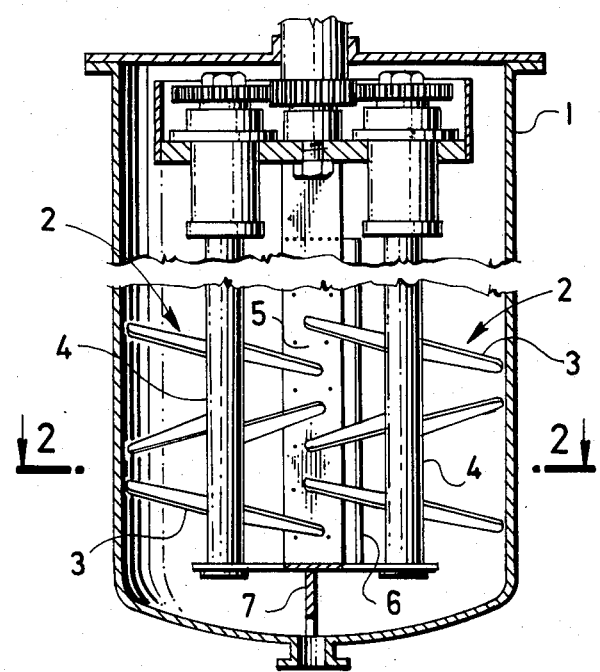

United States Patent [19]

Kolínsky et al.

[11] Patent Number: 4,690,989
[45] Date of Patent: Sep. 1, 1987

[54] METHOD FOR THE SINGLE-STEP PRODUCTION OF VINYL POLYMERS

[75] Inventors: Miloslav Kolínsky; Václava Jísová; Josef Babka, all of Prague, Czechoslovakia

[73] Assignee: Ceskoslovenska akademie ved, Czechoslovakia

[21] Appl. No.: 796,558

[22] Filed: Nov. 8, 1985

[30] Foreign Application Priority Data

Nov. 10, 1984 [CS] Czechoslovakia ............. 8572-84

[51] Int. Cl.$^4$ .......................... C08F 2/02; C08F 14/06
[52] U.S. Cl. ...................................... 526/88; 526/173; 526/344.1; 526/918; 422/135
[58] Field of Search ............ 526/88, 344.1, 918, 526/173; 422/135; 366/288

[56] References Cited

U.S. PATENT DOCUMENTS

| | | | |
|---|---|---|---|
| 3,362,793 | 1/1968 | Massoubre | 422/135 |
| 3,469,948 | 9/1969 | Anderson et al. | 526/88 X |
| 3,799,917 | 3/1974 | Rathke | 526/88 |
| 3,875,131 | 4/1975 | Lim et al. | 526/344.1 X |
| 3,877,881 | 4/1975 | Ono et al. | 23/285 |
| 4,277,585 | 7/1981 | Fournel et al. | 526/65 |
| 4,325,915 | 4/1982 | Sato et al. | 422/135 |
| 4,438,074 | 3/1984 | Wilt | 422/135 |

Primary Examiner—Joseph L. Schofer
Assistant Examiner—F. M. Teskin
Attorney, Agent, or Firm—Leydig, Voit & Mayer

[57] ABSTRACT

The invention relates to a method and to a reactor for the single-step polymerization of vinyl monomers by a heterogeneous polymerization in bulk by means of organometalic catalysts. A method according to the invention consists in charging a vertical reactor, which is provided with at least two planetary stirrers situated outside the reactor axis, each stirrer formed from a planar centrally-symmetrical two-blade paddle, with a vinyl monomer, the subsequent introduction of an organometalic catalyst in a solution under stirring and in partial doses amounting to $10^{-5}$ to $10^{-3}$ mole up to the final amount of $5 \times 10^{-4}$ to $5 \times 10^{-2}$ mole of catalyst per mole of monomer, stirring of the batch, cutting and disintegration of the formed compact mass with the planetary stirrers and its parallel wiping from the surface of reactor with wiping blades until the batch acquires a powdery form and the resulting product is discharged.

3 Claims, 5 Drawing Figures

U.S. Patent    Sep. 1, 1987    4,690,989

METHOD FOR THE SINGLE-STEP PRODUCTION OF VINYL POLYMERS

The invention relates to a method for the single-step preparation of vinyl polymers by a heterogeneous polymerization of monomers in bulk under the effect of organometalic catalysts and solves the problem of polymerization up to a high degree of conversion. At the same time, the invention relates to an arrangement of the reactor for performing the said method of polymerization.

In the Czechoslovak Pat. No. 150,858, the method of production of a thermally stable poly(vinyl chloride) by the bulk heterogeneous polymerization of monomer under the effect of an organometalic catalyst is described, where the reactor used is provided with a relatively simple stirrer, e.g. paddle, horsehoe, and the like. A disadvantage of the method according to that earlier invention consists in the fact that either a higher conversion and a relatively low molecular mass, or, on the contrary, a higher molecular mass and a relatively low degree of conversion are attained. This is manifested in limit cases presented in the examples 1 and 6 of the Czechoslovak Pat. No. 150,858, where the conversion of 17.3% and molecular mass of 62,000 and, respectively, the conversion of 8.3% and molecular mass of 134,000 were attained.

The disadvantage mentioned above is reduced by a method according to the present invention, wherein a vinyl monomer is charged into a vertical reactor provided with planetary stirrers situated outside the reactor axis and then, under stirring, an organometalic catalyst is introduced in partial doses of $10^{-5}$ to $10^{-3}$ mole until a final amount of $5 \times 10^{-4}$ to $5 \times 10^{-2}$ mole of catalyst per mole of monomer is achieved and the batch is stirred with cutting and disintegration of the formed compact mass by the planetary stirrers and the polymer is wiped at the same time from the internal surface of reactor by wiping blades. The batch gradually attains a powdered form of whole-meal and the final product is discharged from the reactor for further processing.

The invention also relates to a vertical reactor for performing the invented method, wherein the said reactor is provided with a combination of a planetary stirring equipment and a wiping equipment. The planetary stirring equipment consists of at least two planetary stirrers, each of which is formed from planar two-blade paddles with a central symmetry. The longitudinal axes of paddles pass through a rotation axis of the stirrer and include the angle $\pm \beta$ amounting to 15° to 20° with a plane perpendicular to this axis. The paddles are turned around their axes towards a plane perpendicular to the rotation axis of stirrer by the angle $\pm \alpha$ amounting to 25° to 35°. The paddles of stirrers overlap in the range of 15 to 20% of a fictional cylindrical surface circumscribed by a trajectory of the terminal points of paddles. The shafts of stirrers are mounted in a driver also carrying a wiping equipment which is formed by at least two wiping blades.

An intense agitation and whirling is attained by the procedure according to the invention and with the combined planetary and wiping equipment according to the invention, which prevents from aggregation of the polymer because the formed cheese-like clusters are destroyed already in the initial stage and a lumpy or powdery product arises. A perfect dispersion of the catalyst and, consequently, formation of a large number of initiation centres is obtained by an intense turbulence in the whole volume of reaction mixture even at a low rotation speed. The required homogeneity of chemical and physical conditions is maintained in the whole reaction volume. The result is a higher degree of monomer conversion to polymer and, at the same time, the polymer with a higher molecular mass and a higher terminal stability is obtained. Sticking of polymer particles to the inner wall of reactor is also suppressed and its deposition on the stirrers and wiping blades is reduced. The wiping blades also assist in the faster exchange of heat between a thermostating medium and the reaction mixture by removing the deposits on the inner wall of reactor and thus improve efficiency of the equipment.

The effect of the method according to the invention is further illustrated in examples of performance which, however, do not limit the scope of invention by any means.

EXAMPLE 1

The reactor shown in FIG. 1 was charged with 14.5 kg of vinyl chloride and thermostated to 0° C. to 5° C., which temperature was maintained for the whole polymerization time. Then, tert-butyllithium dissolved in pure heptane was stepwise metered under stirring in 6 portions as a catalyst into the reactor during 19 hours up to the total concentration $2 \times 10^{-3}$ mole per mole of vinyl chloride. The yield was 3.4 kg of polymer, i.e. the conversion of 23.5%. The polymer had molecular mass $M_n = 148,000$.

EXAMPLE 2

The reactor shown in FIG. 1 was charged with 10.5 kg of vinyl chloride and the reaction temperature was maintained at 0° to 5° C. The catalyst—a pentane solution of tert-butyllithium—was metered during 20 hours up to the total concentration $3 \times 10^{-3}$ mole per mole of vinyl chloride. The yield was 3.2 kg of poly(vinyl chloride), i.e. the conversion of 30.5%. The polymer had molecular mass $M_n = 155,000$.

Figures 3, 4:
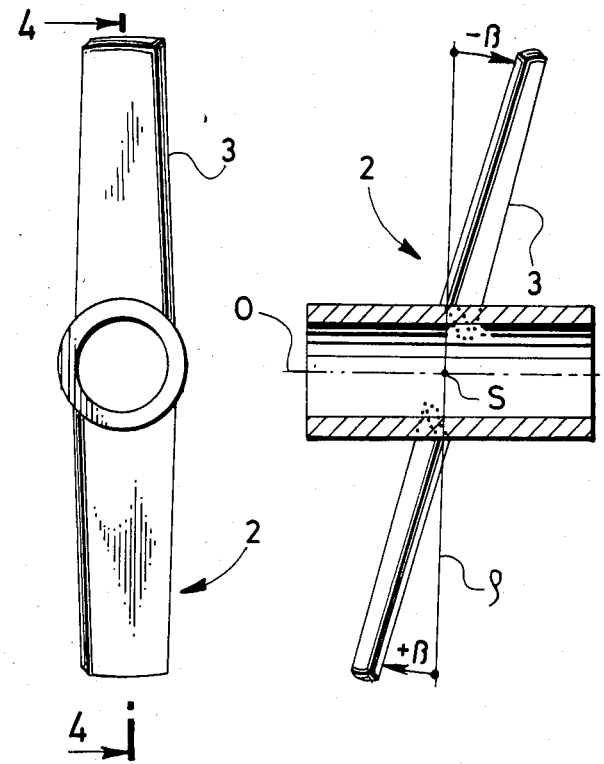
Figure 2:
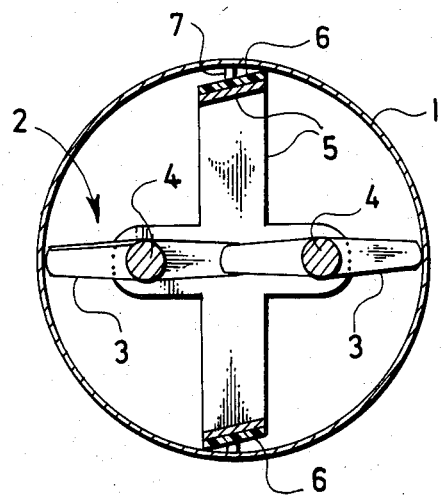
Figure 5:
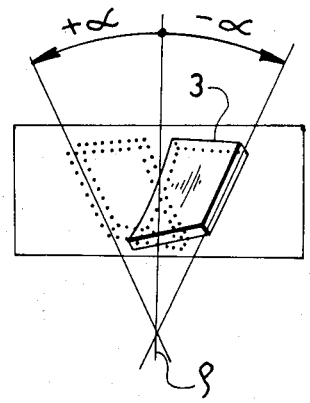

FIG. 1 shows the interior of the reactor, where two-blade paddles of planetary stirrers and wipers of the reactor bottom are drawn in a sectional view. FIG. 2 shows a cross-sectional view of the reactor interior in the plane 2—2. A view of the two-blade paddle in the direction of rotation is presented in FIG. 3. A cross-sectional view of the double-blade of the paddle in the plane 4—4 is in FIG. 4. FIG. 5 presents a side view of the two-blade paddle.

The assembly of the combined planetary stirring equipment and the wiping equipment is placed in the vertical reactor 1, the inner wall of which is drawn in FIG. 1 as a dashed line. In the given case, the planetary stirring equipment consists of two planetary stirrers 2, which are revolvingly mounted in a driver 5 and rotary driven with a system of gears. Two wiping blades 6 are fitted to the side of the driver 5 and the wiper 7 circulate around the vertical axis of the reactor 1 as it is obvious also from FIG. 2. Details of the design of the planetary stirrer are drawn in FIGS. 2 to 5, where the point S on the vertical axis o represents a centre of symmetry of the two-blade paddle 3. In the drawings, the angle $\alpha$ is 25° and the angle $\beta$ is 15°. The two-blade paddles 3 of the planetary stirrers 2 are arranged one above the other and the adjoining pairs of two-blade paddles 3 are arranged symmetrically in a plane set through their centres of symmetry S perpendicularly to the axis of shaft 4 of the planetary stirrer 2, i.e. they are either inclined or declined to each other. The side view of the two-blade paddle 3 shows clearly displacement of the individual blades towards a plane perpendicular to the axis of shaft 4. The visible blade is turned by the angle $\alpha = -25°$ and the invisible blade is turned by the angle $\alpha = +25°$ with respect to the said plane.

The method and the reactor according to the present invention serve for the polymerization of vinyl monomers, above all in the preparation of a thermally stable poly(vinyl chloride).

We claim:

1. A method for the single-step production of vinyl polymers by a non-radical heterogeneous polymerization in bulk under the effect of organometallic catalysts, which comprises: adding a vinyl monomer to a vertical, cylindrical reactor which is provided with at least two planetary stirrers placed outside of the reactor axis each of said planetary stirrers having at least one planar centrally symmetrical two-blade paddle, and means for wiping the sidewalls of said reactor; subsequently introducing into said reactor a solution of an organometallic catalyst under intense stirring in sequential partial doses of size $10^{-5}$ to $10^{-3}$ mole to achieve a total catalyst amount of $5 \times 10^{-4}$ to $5 \times 10^{-2}$ mole of catalyst per mole of the monomer; allowing the monomer to undergo non-radical heterogeneous polymerization under the influence of the organometallic catalyst; intensely stirring the contents of the reactor; cutting and disintegrating any formed compact mass with the planetary stirrers while concurrently wiping the sidewalls of the reactor with said wiping means until the polymer acquires a powdery form; and discharging the powdery product.

2. A method for the single step production of vinyl polymers according to claim 1 wherein said reactor further comprises a combination of planetary stirring equipment and wiping equipment, where said planetary stirring equipment comprises at least two planetary stirrers placed outside of the reactor axis and each of the planetary stirrers comprises a shaft which is mounted onto a common driver, planar centrally symmetrical two-blade paddles, the longitudinal axis of which passes through the rotational axis of the planetary stirrer, said planetary stirrer paddles having their longitudinal axes disposed at an angle $\pm \beta$ of 15° to 20° from the perpendicular of the rotational axis, and oriented about their longitudinal axes towards the plane perpendicular to the rotational axis of the planetary stirrer at an angle $\pm \alpha$ of 25° to 35°; and where said wiping equipment comprises at least two wiping blades carried by said driver.

3. A method for the single-step production of vinyl polymers according to claim 2 wherein the planetary stirrer blade paddle portions overlap in the range of 15 to 20% of a fictional cylindrical surface circumscribed by a trajectory of the terminal points of said paddles.

* * * * *